United States Patent [19]

Falvo et al.

[11] Patent Number: 5,963,610

[45] Date of Patent: Oct. 5, 1999

[54] CEDM DATA ACQUISITION SYSTEM

[75] Inventors: Gregory E. Falvo, Enfield; Michael P. Chaplin, deceased, late of Enfield, by Geraldine Chaplin Spouse; Stanley L. Klein, Cromwell, all of Conn.

[73] Assignee: Combustion Engineering, Inc., Windsor, Conn.

[21] Appl. No.: 09/005,742

[22] Filed: Jan. 12, 1998

Related U.S. Application Data

[60] Provisional application No. 60/035,514, Jan. 15, 1997.

[51] Int. Cl.$^6$ ...................................................... G21C 17/10
[52] U.S. Cl. ........................... 376/259; 376/258; 376/240
[58] Field of Search .................................... 376/216, 240, 376/245, 258, 259

[56] References Cited

U.S. PATENT DOCUMENTS

| | | | |
|---|---|---|---|
| 4,668,465 | 5/1987 | Boomgaard et al. | 376/216 |
| 5,076,996 | 12/1991 | Miyaguchi et al. | 376/258 |
| 5,408,508 | 4/1995 | Federico et al. | 376/259 |

FOREIGN PATENT DOCUMENTS

WO 97/41566   11/1997   WIPO .

OTHER PUBLICATIONS

Patent Abstracts of Japan vol. 096, No. 008, Aug. 30, 1996, JP 8–105992.

*Primary Examiner*—Daniel D. Wasil
*Attorney, Agent, or Firm*—L. James Ristas; John H. Mulholland

[57] ABSTRACT

A CEDM data acquisition system (40) receives analog coil-current signals from control element drive mechanism coils (18, 20); conditions the analog signals to remove noise induced therein by the electronic circuitry (44) associated with the control element drive mechanisms; digitizes the conditioned analog signals; displays the acquired test data; and records the data for future use. The inventive data acquisition system preferably has the ability to simultaneously measure, display and record coil-current data for all of the five coils associated with each CEDM rod-group with respect to time. Further, the inventive data acquisition system preferably allows the user to monitor, display and record data for up to eight CEDMs simultaneously. It also allows the measurement of rod-drop times during rod-drop testing of the CEDMs.

15 Claims, 10 Drawing Sheets

CoilCEt Program Flow

1. Launch program.
2. Program "Splash Screen".
3. Program Main Menu.
   3.1. Play Recorded Trace.
   3.2. Create a new trace.
   3.3. Configure Program.
   3.4. Quit.
4. Displaying a trace.
   4.1. Electro-magnet Coil Current vs. Time.
   4.2. Display all Coils for one motor at a time.
   4.3. Ability to select any of eight motors to display.
   4.4. Ability to add Reed Switch Position Indicator (RSPT) to any display.
   4.5. 300 Samples per second displayed.
   4.6. Display updated every one second.
   4.7. Ability to freeze the display on command.
   4.8. Interactive Cursors to measure coil Current.
   4.9. Measure timing of each coil and between coils.
5. Monitoring for a Rod Drop Event.
   5.1. User can select to monitor for a rod drop event.
   5.2. Program will display the RSPT on screen.
   5.3. Program will watch the Upper Gripper current.
   5.4. If current goes above a "threshold value" the motor is running.
   5.5. If not, the program watches the "holding current" of the coil.
   5.6. If the coil looses the "holding current" then a rod drop event occurred.
   5.7. On rod drop event then display will show only the upper gripper current and the RSPT position verses time, indexed on the initiation of the rod drop event.
   5.8. An "Acceptance" trace will be superimposed on the rod drop event display.
   5.9. The user can save the rod drop event and can then return to the monitoring screen.
6. Recording a monitoring trace.
   6.1. The user can chose to record one motor's worth of coils.
   6.2. The user can chose to record all eight motor's worth of coils.
   6.3. The user can record just a rod drop event.

CEDM DATA ACQUISITION SYSTEM

CROSS-REFERENCE TO RELATED APPLICATION

This application claims priority based on Provisional application Ser. No. 60/035,514 filed on Jan. 15, 1997.

BACKGROUND OF THE INVENTION

1. Field of the Invention

The present invention generally relates to the field of diagnostic techniques for nuclear reactor subsystems in a nuclear steam supply system. More particularly, the present invention is directed to a control element drive mechanism (CEDM) in such nuclear power plants.

2. Description of the Related Art

In a typical pressurized water nuclear power reactor, a plurality of control element assemblies with associated drive mechanisms (CEDMs) are supported on a nuclear reactor vessel for moving the control element assemblies into and out of the reactor core, for the purpose of controlling the gross power level, or the power distribution in the core. Typically, each control element assembly (CEA) has a shaft which is driven by a CEDM. Such CEDMs each include a plurality of electromagnetic coils having latches which engage grooves on the shaft of the CEA, whereby the shaft may be moved in step-wise fashion. The shaft terminates in a web or similar structure, which supports a plurality of individual control elements or rods sized to pass through openings within or between fuel assemblies which define a reactor core.

A particular nuclear reactor may have dozens of CEAs, which are typically grouped or ganged in sets or four or eight, so as to move in unison when actuated by respective control element drive mechanisms. In the event of an emergency, the CEAs can be disengaged from their respective drive mechanisms, thereby falling under force of gravity into the reactor core to shut down the reactor power as quickly as possible. This free fall of a CEA is also known as a rod-drop.

The position and movement of each CEA and, hence, its associated control rods, is typically sensed by a reed switch position transmitter which produces an analog position output signal that is sent to a safety control system during normal operation of the power plant. This signal can be used within the safety control system as part of a calculation to determine if the reactor should be tripped, thereby causing the rods to drop.

Nuclear steam supply system plants such as those described above routinely perform post-refueling rod testing prior to power ascension. The testing normally consists of a CEDM operational test, withdrawal and insertion of the rods, a rod coupling verification test, a rod-drop test from a small height, and a full height rod-drop, on each CEDM. Such testing is normally performed at reactor operating temperature and pressure. Data is acquired during the CEDM operational tests and analyzed to verify that the nuclear steam supply system is fully operational before normal power ascension occurs. This data can then be used for troubleshooting or to generate outage reports according to governmental regulations. Further due to governmental regulations, the data acquired during CEDM operational testing must be archived for possible review in the future.

In the related art, electromechanical data collection apparatus (typically analog strip chart recorders such as the Honeywell Visicorder) are utilized to record coil-current within the control element drive mechanisms and, optionally, the signal outputted from the reed switch position transmitters. Typically, the test data is collected in a "cable spreader" room in which the CEDM control cabinet is located. Since testing occurs on a periodic basis, test points for electrically connecting the data collecting apparatus are permanently provided in the control cabinet.

However, data recorded in such a manner results in signal traces being displayed on long continuous rolls of paper which is expensive, bulky in storage and extremely difficult to manipulate when manual trace analysis occurs. Furthermore, such electromechanical systems are prone to mechanical failure thereby further increasing testing delays and increasing expense.

Still another deficiency of the above-described electromechanical systems is that, due to the limited recording capability of such systems, CEDM operational testing must be performed on one CEA at a time. In particular, this is due to the fact that each drive mechanism typically employs four or five electromagnetic coils to position the associated CEA and one reed switch position transmitter is associated with each CEA. Thus, each CEDM operational test entails recording up to six parameters of data per CEDM tested. Because the known mechanical recording apparatus can only record six parameters at a time, all CEAs in a group (consisting of four or eight CEAs) cannot be tested simultaneously. Rather, multiple tests must be run (four or eight as the case may be) to verify performance of all of the drive mechanisms associated with the CEAs of the group.

The above-described deficiencies of the related data acquisition systems, thus, include increased testing expenses, prolonged testing operations, difficulty in analyzing and storing recorded data and a likelihood of mechanical failure of the test equipment.

Accordingly, there remains a need in the art for a CEDM data acquisition system which overcomes the aforementioned deficiencies by simplifying data gathering, storage, and manipulation for, e.g., troubleshooting, generation of outage reports, and data archiving.

There remains an additional need in the art for an improved CEDM data acquisition system which overcomes the aforementioned deficiencies by permitting simultaneous recordation of data pertaining to all of the CEDMs in a CEA group while not requiring any modification of the nuclear power plant.

There remains a further need in the art for a CEDM data acquisition system which overcomes the aforementioned deficiencies by providing continuous and interactive CEDM test monitoring on an easy to read and analyze color display, such monitoring occurring while the CEDM operational tests occur.

There remains yet another need in the art for a CEDM data acquisition system which overcomes the aforementioned deficiencies of the related art by providing a test data display which has the capability to automatically change the parameters displayed upon the occurrence of a predetermined triggering event such as a rod-drop event.

SUMMARY OF THE INVENTION

It is accordingly an object of the present invention to provide an improved CEDM data acquisition system which provides simplified data gathering, storage and manipulation for, e.g., troubleshooting, generation of outage reports, and simplified data archiving.

It is a further object of the present invention to provide an improved CEDM data acquisition system which permits simultaneous recordation of data pertaining to all of the CEDMs in a CEA group while not requiring any modification of the nuclear power plant.

It is another object of the present invention to provide an improved CEDM data acquisition system which provides continuous and interactive CEDM test monitoring on an easy to read and analyze color display, such monitoring occurring while the CEDM operational tests occur.

It is yet another object of the present invention to provide an improved CEDM data acquisition system which displays images of the acquired test data and has the capability to automatically change the parameters displayed upon the occurrence of a predetermined triggering event such as a rod-drop event.

It is yet another object of the present invention to provide a CEDM data acquisition system for use in the CEDM operational testing of nuclear steam supply systems which offers an optimal combination of simplicity, reliability, efficiency, and versatility.

These and other objects and advantages of the present invention are provided in one embodiment by providing a CEDM data acquisition system which (1) receives analog coil-current signals from control element drive mechanism coils; (2) conditions the analog signals to remove noise induced therein by the electronic circuitry associated with the control element drive mechanisms; (3) digitizes the conditioned analog signals; (4) displays the acquired test data; and (5) records the data for future use. The inventive data acquisition system preferably has the ability to simultaneously measure, display and record coil-current data for all of the five coils associated with each CEDM rod-group with respect to time. Further, the inventive data acquisition system preferably allows the user to monitor, display and record data for up to eight CEDMs simultaneously. It also allows the measurement of rod-drop times during rod-drop testing of the CEDMs.

In the preferred embodiment of the inventive data acquisition system, the data from the CEDM is digitized following signal conditioning and is processed and displayed on a display screen in real time (i.e., as the CEDM operates). Preferably the display screen displays five coil-current traces versus time for a particular CEDM. These traces move horizontally through the screen in real time as the CEDM cycles to move the control rod at, e.g., about 0.75 inches (1.9 cm) per cycle. Preferably the operator can select that the traces pass continuously or, alternatively, that a particular display screen be frozen for study.

The operator can select any one of, e.g., eight CEDMs (identified at the top of the display screen), which are grouped for simultaneous movement, and display and record all group related data, e.g., up to forty coils. The data from all of the coils of any CEDM can be stored and replayed as desired. At the operator's option, traces indicative of CEDM reed switch position versus time can also be displayed for analysis. These traces originate from reed switch position transmitters (RSPT) in the CEDMs.

The operator analyzes the traces for timing, shape or anomalies in a manner similar to what is conventional for the analysis of strip chart traces of the related art. However, since the data is digitally recorded and, thus, easy to manipulate, data analysis, data storage and report generation are greatly simplified.

One preferred aspect of the inventive data acquisition system includes the ability of the display to automatically change images upon the occurrence of a rod-drop event. For example, when the coil-current signal for a given CEDM coil deviates from a predetermined value by a predetermined amount, the display automatically switches from displaying five coil-current signals and a position signal, to displaying only the triggering coil-current signal and the position signal. Optionally, the subsequent display image can also include an "acceptance" coil-current trace superimposed on the two aforementioned signal traces to aid a user in analyzing the coil-current trace of the triggering coil.

The signal conditioning portion of the inventive data acquisition system includes a noise suppression network preferably consisting of differential amplifies and low pass filters with high common mode rejection in order to suppress unwanted electrical noise originating in the CEDM power supply and to prepare the analog coil-current and position signals for digitization. Accordingly, the signal conditioning portion of the system also provides the electrical interface between a digital processing unit (such as a computer) and the control cabinet test points. Optionally, the signal conditioning portion of the system can include an isolation amplifier to ensure that voltage spikes, or other erroneous electrical signals, which may occur downstream in the system are not fed back to the control element drive mechanisms thereby creating the possibility of inadvertently triggering a rod-drop.

BRIEF DESCRIPTION OF THE DRAWINGS

The preferred embodiments of the present invention will be described below with reference to the accompanying drawings wherein like numerals represent like structures and wherein:

FIG. 4 is a detailed chart of the performance options available with the inventive CEDM data acquisition system;

DESCRIPTION OF THE PREFERRED EMBODIMENT

Figure 1:
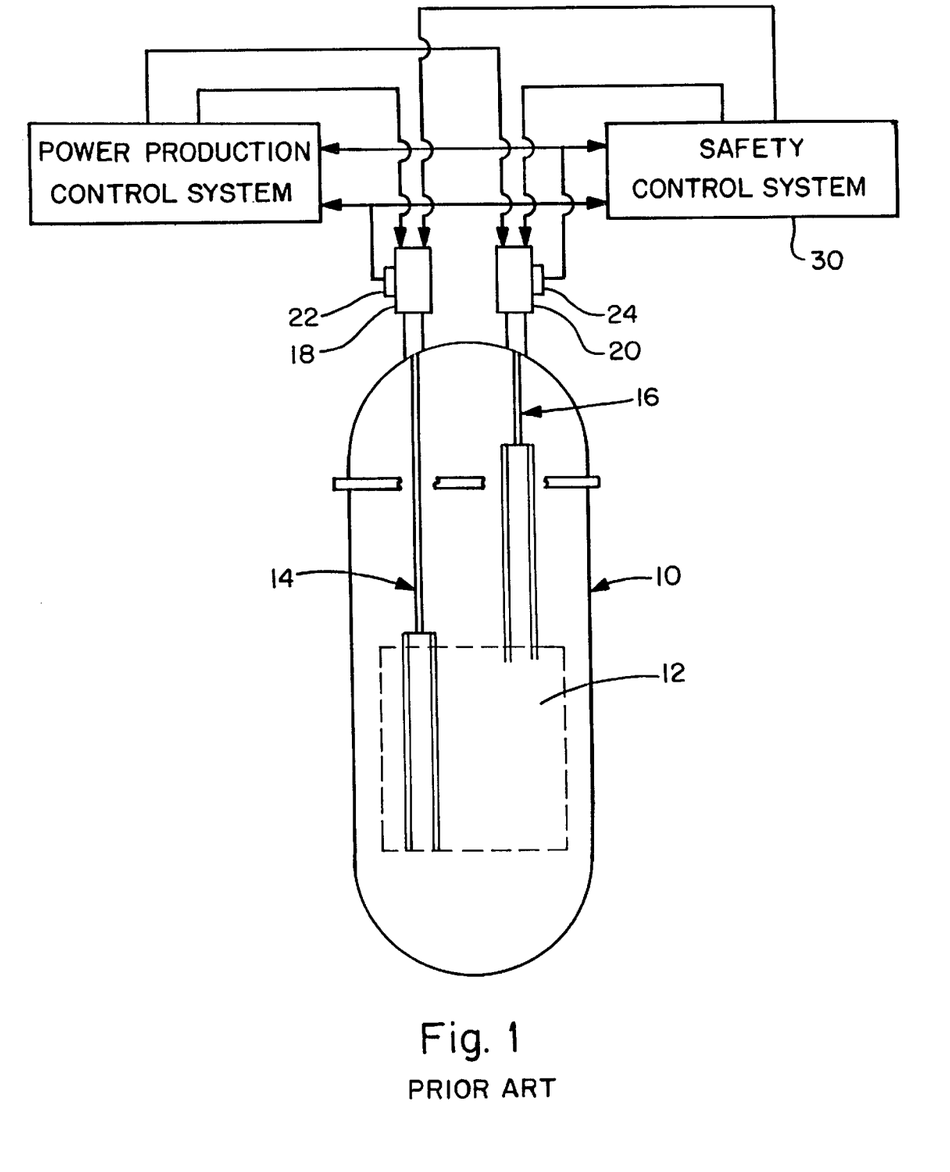
FIG. 1 is a schematic representation of a conventional nuclear reactor having control element assemblies and associated control systems.

FIG. 1 is a simplified representation of a conventional nuclear reactor 10 of the type with which the inventive data acquisition system can be used. As shown therein, reactor 10 has a reactor core 12 and a representative two 14, 16 of a multiplicity of control element assemblies (CEAs), each movable by respective control element drive mechanisms 18, 20 through the reactor core. The drive mechanisms such as 18 and 20 are powered by an electronic power supply utilizing silicon controlled rectifiers and have power supply cables leading to a CEDM control cabinet (not shown) located in a cable spreader room (not shown). Means, 22 and 24, such as reed switch position transmitters, are responsive to the movement of the CEA shaft, for generating analog position signals indicative of the CEA position. Each position signal is delivered to a safety control system 30 which, after processing this input signal along with a multiplicity of other signals indicative of plant operating parameters, can generate safety trip signals for delivery to each of the CEA drive mechanisms 18, 20, whereby the shaft of every CEA is released.

Figure 2A:
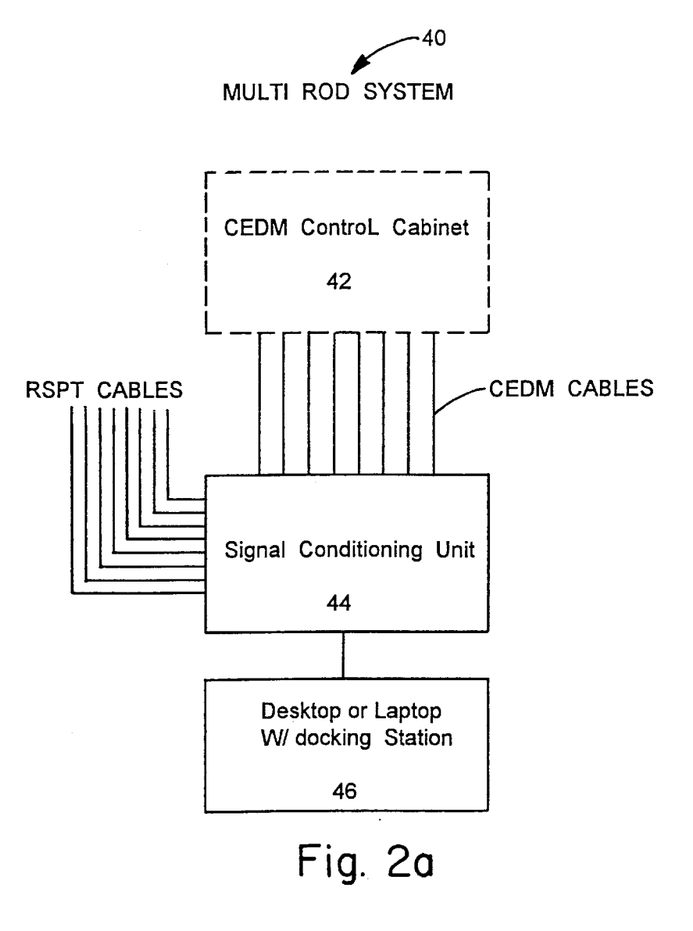
FIG. 2a is a schematic representation of a first preferred embodiment of the inventive CEDM data acquisition system.
Figure 2B:
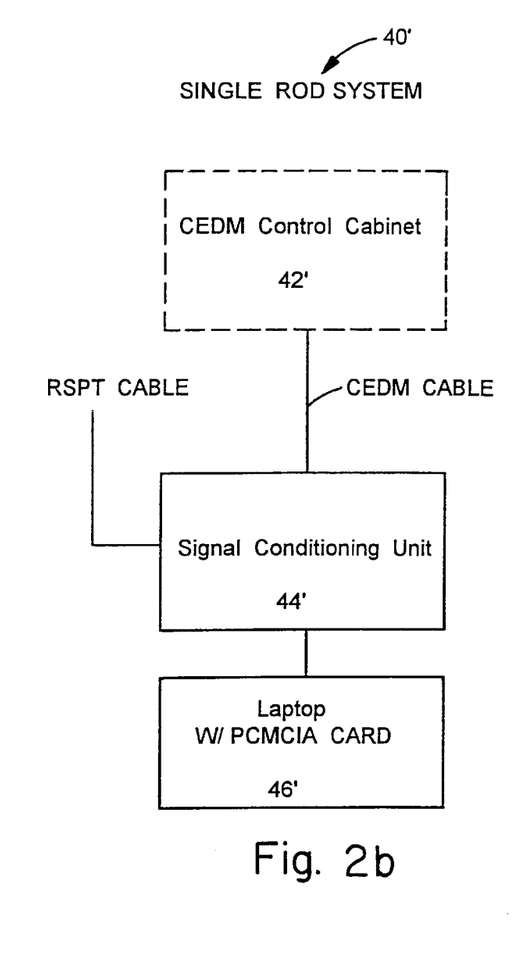
FIG. 2b is a schematic representation of a second preferred embodiment of the inventive CEDM data acquisition system.

Turning now to the invention, systems 40 and 40' of FIGS. 2a and 2b, respectively, are general schematic representations of the first and second preferred embodiments of the inventive CEDM data acquisition system shown in combination with CEDM control cabinets such as those of the conventional nuclear reactor 10 described above. The primary difference between the first and second preferred systems 40 and 40' resides in the ability of system 40 to acquire all of the data associated with eight individual CEAs simultaneously, whereas the system 40' is only capable of acquiring data for a single CEA at any given time. Accordingly, system 40' is a more streamlined version of system 40.

As shown in FIG. 2b system 40' includes a signal conditioning unit 44' and an associated computer 46'. Signal conditioning unit 44' and computer 46' preferably communicate with one another via a conventional data transmission cable. Signal conditioning unit 44' receives conventional analog coil-current signals from a conventional CEDM control cabinet 42' via a cable. Additionally, signal conditioning unit 44' receives analog position signals from a conventional reed switch position transmitter (RSPT) via a RSPT cable. Thus, within system 40' the flow of information is generally first into signal conditioning unit 44' and subsequently into computer 46' where the data can be manipulated by the user as desired.

As shown in FIG. 2b computer 46' is preferably a lap top computer with a PCMCIA card for digitizing conditioned analog signals presented thereto by signal conditioning unit 44'. While the use of a lap top naturally offers the convenience of portability, a desk top PC with an analog to digital (A/D) conversion board installed therein could also be utilized with system 40'. Finally, signal conditioning unit 44' preferably includes a noise suppression network consisting of differential amplifiers and various filters with high common mode rejection to suppress unwanted electrical noise and to prepare the conditioned analog signals for delivery to computer 46'.

Since those of ordinary skill in the art will appreciate how to implement the system 40' of FIG. 2b based on the following description of the more elaborate system 40 shown in FIG. 2a, the remainder of this specification will be primarily directed to describing system 40 of FIG. 2a.

As shown in FIG. 2a system 40 is a more elaborate embodiment of the inventive data acquisition system which is capable of simultaneously receiving data associated with eight CEAs and eight associated RSPTs. As with the embodiment of FIG. 2b, the flow of information is generally into signal conditioning unit 44 and subsequently into computer 46. As shown, signal conditioning unit 44 and computer 46 transfer information via a conventional data transmission cable. Additionally, conventional CEDM control cabinet 42 is connected to signal conditioning unit 44 with eight cables (one cable per CEA being monitored). Finally, CEA position data is transferred into conditioning unit 44 for up to eight RSPTs simultaneously by using eight cables.

Computer 46 can be either a desk top PC or a lap top PC with a cooperating docking station. In either case, computer 46 preferably utilizes Keithly Metrabyte Inc.'s personal computer (PC) analog to digital (A/D) conversion boards in order to digitize the conditioned analog signals entering computer 46 at a rate of about 500 samples per second. Additionally, computer 46 preferably includes a monitor for displaying the digitized signals presenting various display images of the digitized data acquired. Finally, conditioning signal unit 44 includes a noise suppression network consisting of differential amplifiers and various filters with high common mode rejection to suppress unwanted electrical noise originating from the CEDM power supply and to prepare the analog signals for the A/D conversion boards of computer 46.

Figure 3:
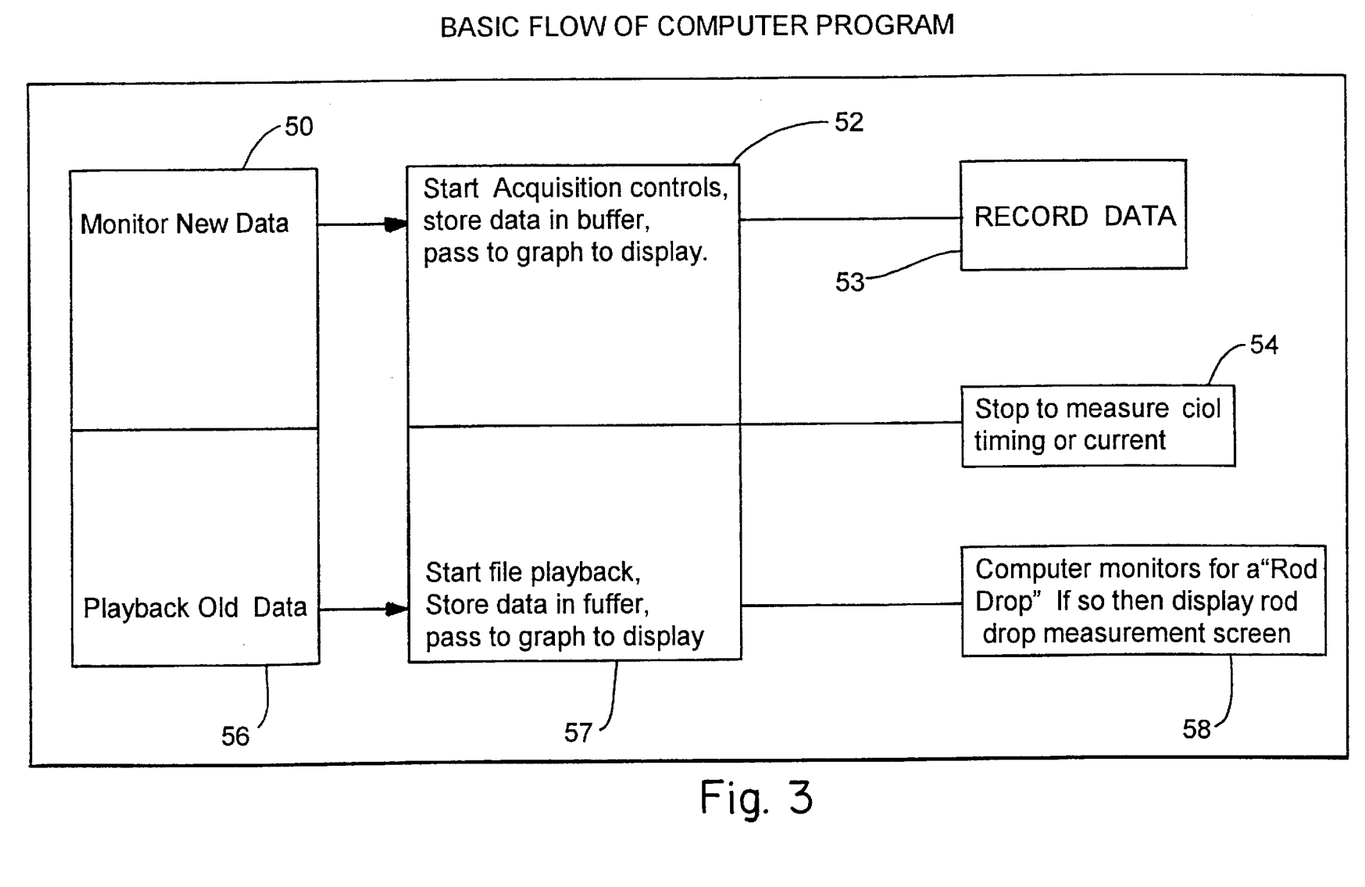
FIG. 3 is a block diagram of the steps associated with implementing the inventive CEDM data acquisition system.

The software utilized to implement the system 40 of FIG. 2a is illustrated on a general level in FIG. 3. The preferred programming language for the software of FIG. 3 is Microsoft Visual Basic Version 4.0. Visual Basic Custom Controls (product VTX-DAS from Keithly Metrabyte, Inc. (VBX)) is preferably utilized to implement all of the data acquisition, data handling and data storage features of the inventive system 40. Additionally, a simple linking program to the Visual Basic Custom Control Program from Scientific Software Tools, Inc. (LABOJX Real Time Chart) is preferably utilized to implement the various graphing functions discussed further below. The software is compatible with the Windows working environment. Naturally, those of ordinary skill will recognize that many other programming languages and software options could also be used to produce the inventive system 40 without departing therefrom.

As shown in FIG. 3, the inventive data acquisition system provides the ability to monitor, record and playback newly acquired data. The selection of entering a monitoring mode occurs at block 50 in which case the software then proceeds to block 52 where the data acquisition, data storage in a buffer and graphical display of the data begins. Once data acquisition has begun in block 52 the inventive system, optionally, monitors for a "rod-drop" event at block 58. Once a "rod-drop" has occurred, the display image can automatically change to display a rod-drop measurement screen at block 58 and the data acquisition process terminates. At any time during the data acquisition stage, the user has the option to freeze the display screen to measure the coil-timing and/or coil current, in which case the procedure passes to block 54. Once the data acquisition procedure has begun, the user has the option to permanently record the subsequently acquired data and the procedure passes through the record data block of 53.

Also as shown in FIG. 3, the software of the inventive data acquisition system also has the ability to replay previously recorded data for subsequent analysis. The play back procedure begins at block 56 where the user selects to replay previously recorded data. The process then proceeds to block 57 where data is retrieved from the permanent memory, stored in a buffer and passed for graphical display at the monitor. Naturally, each play back terminates at block 58 once a "rod-drop" has occurred and the display image automatically changes to the rod-drop measurement screen.

During play back, the user also has the option to freeze the screen at any particular point in time to measure coil timing and/or coil current, in which case the procedure passes to block 54. The stored data can then be replayed any number of times desired by repeating the playback process described above.

A more detailed description of the software performance options of the system is illustrated in FIG. 4. As shown therein, the software component of the inventive data acquisition system begins when the software program is launched. A "splash screen" is briefly displayed and then the software displays a main menu which offers the user the options of either replaying a previously recorded trace, acquiring data and creating a new trace, configuring the program or quitting the program.

Figure 5A:
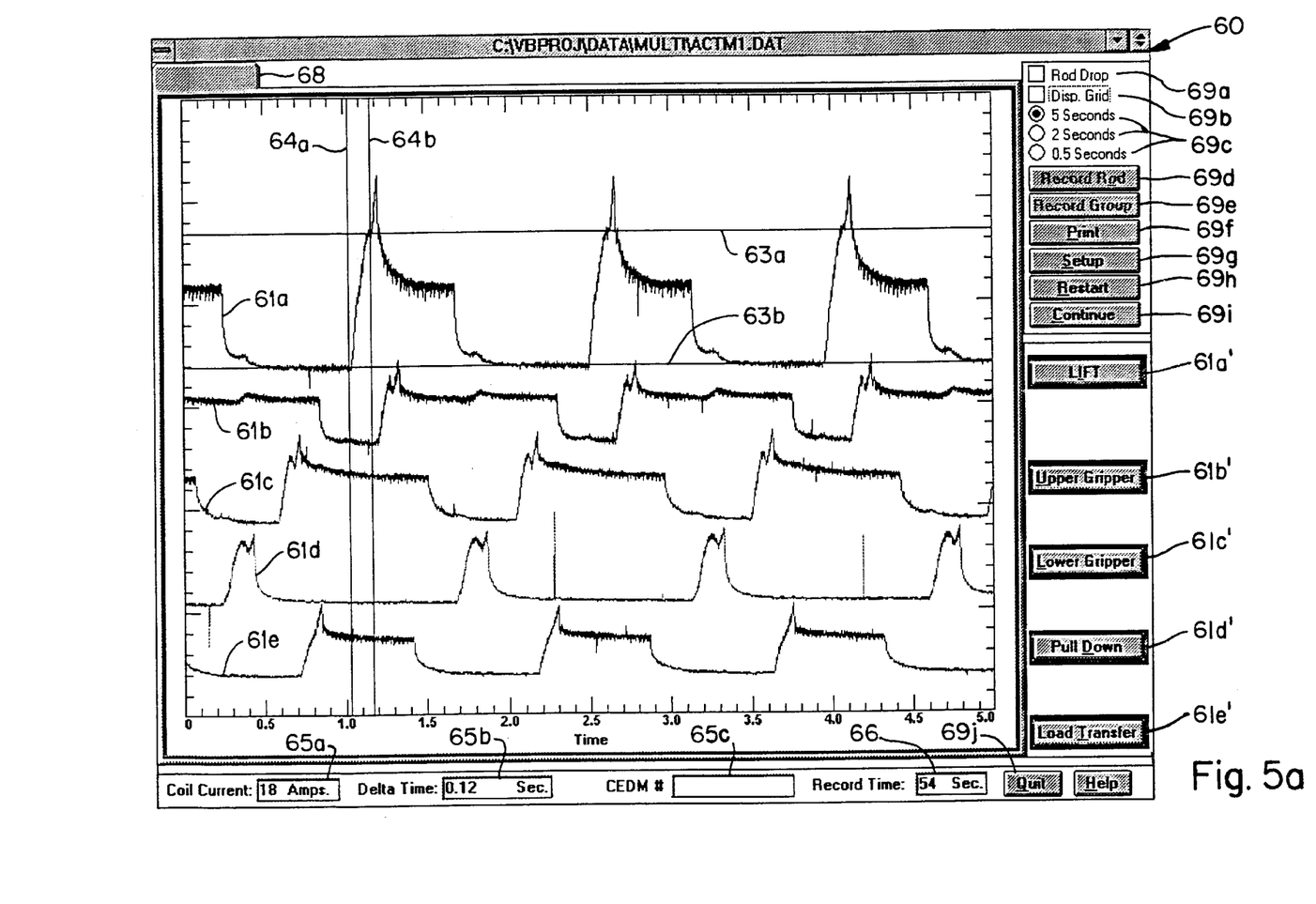
FIG. 5a depicts a representative display image showing a variety of features of the inventive CEDM data acquisition system.

During either the data acquisition mode or the play back mode, the software offers the user a variety of options for displaying acquired and/or recorded data. As can be seen by joint reference to FIGS. 4 through 5c, one display option available to a user includes simultaneous display of coil-current traces for the five coils associated with each CEDM. As shown in FIG. 5a, coil-current traces 61a–61e are recorded/played back at a rate of 300 samples per second with the Y axis representing the coil-current in amps and the X axis representing time in seconds.

Mouse-activated buttons 61a'–61e' allow the user to select any one of the coil-current traces thereby freezing the screen and permitting the use of interactive cursors 63a–64b to measure coil-current and/or timing changes. Real time monitoring can be resumed by selecting the mouse-activated continue button 69i. The resulting coil-current and/or timing changes for the selected coil-current trace are displayed in data boxes 65a and 65b, respectively, for simplified and accurate data analysis. The display shown in FIGS. 5a–5c are preferably updated every second as traces 61a–61e progress leftwardly and the user has the ability to view the displayed data in either of the time-expanded (0.5 second, 2 second or 5 second scales) views by selecting mouse-activated buttons 69c.

When it is desired that data for a single CEA be recorded/played back, the mouse-activated record rod button 69d can be selected. However, where it is desired that CEDM data for an entire rod-group (up to eight CEAs) be recorded/played back, the user selects mouse-activated, record-group button 69e. In such a case, buttons 68, representing each of up to eight CEDMs appear at the top of the display and become activated. Display 60 then shows coil-current traces 69a–69e for the coils of the selected CEDM and the selected CEDM number appears in box 65c for convenience. Naturally, any one of the other seven CEDMs can be monitored simply by selecting the desired mouse-activated CEDM button 68.

Figure 5B:
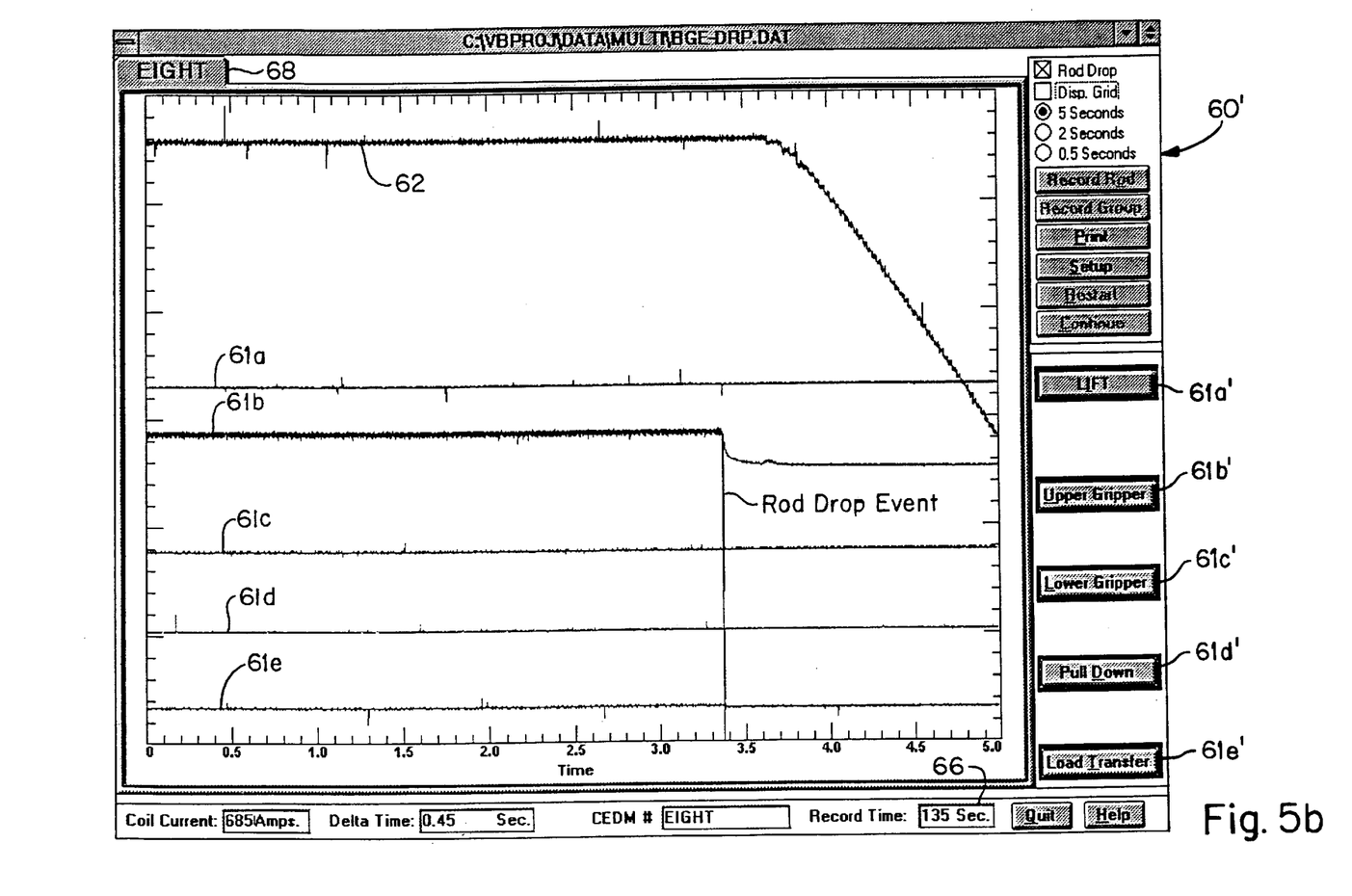
FIG. 5b is another representative display image of the inventive CEDM data acquisition system.
Figure 5C:
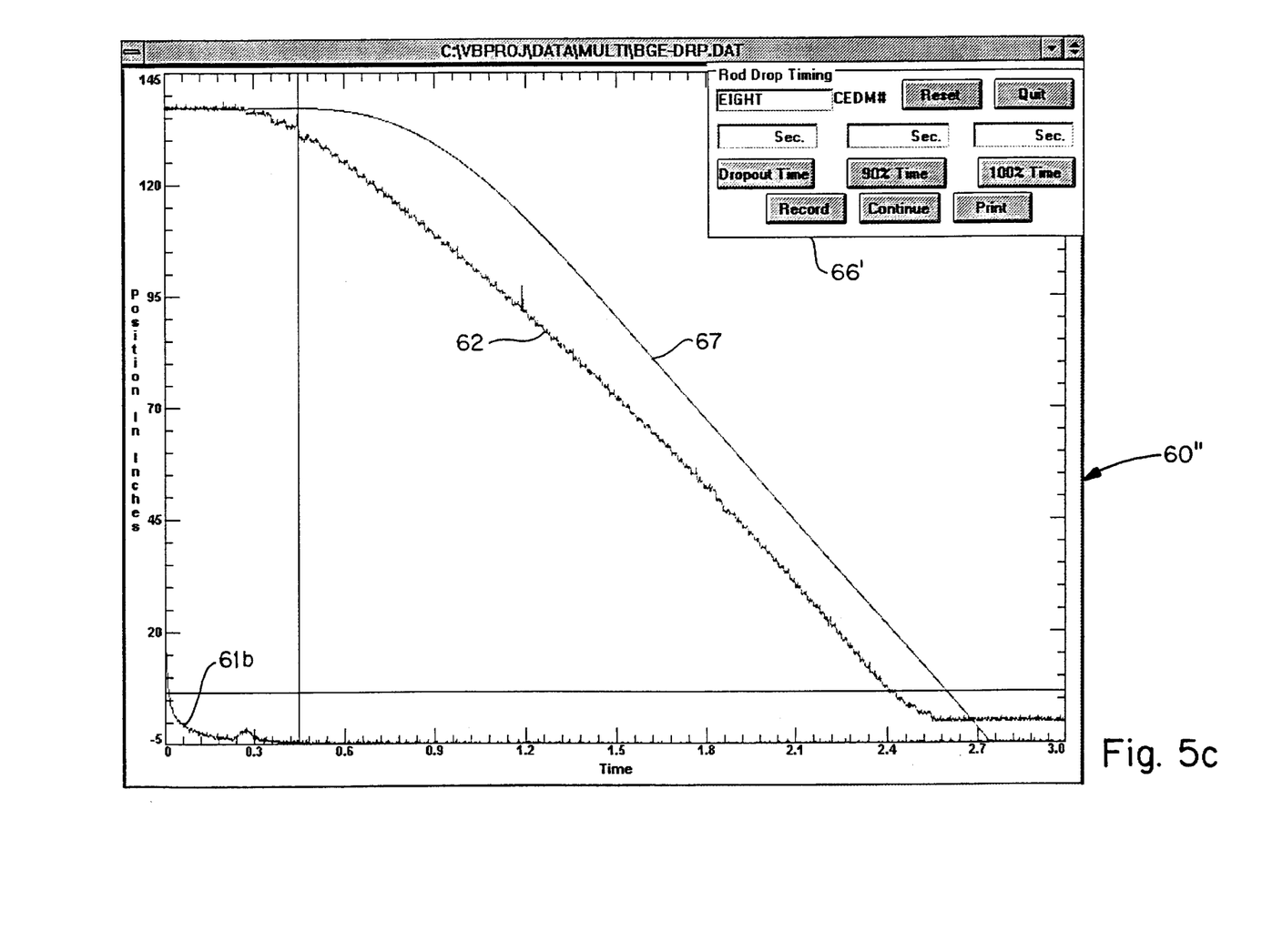
FIG. 5c is still another representative display image of the inventive CEDM data acquisition system.

As noted in FIG. 4 and shown in FIGS. 5a–5c, a user has the option of directing the inventive data acquisition system to monitor for a rod-drop event and to automatically change the display image upon occurrence of the rod-drop event. This feature is implemented on the display screen 60' of FIG. 5b by selecting the mouse-activated rod-drop button 69a during recordation. With rod-drop button 69a, thus, selected the reed switch position (CEA position) signal 62 will be displayed on screen 60' and the data acquisition system will preferably monitor the upper gripper coil-current trace 61b. Before the upper gripper CEDM coil-current has stabilized to a predetermined holding value (see FIG. 5a) no rod-drop event can occur. However, once coil-current trace 61b stabilizes (see FIG. 5b), trace 61b is monitored to determine whether the coil-current is either above or below the pre-determined "holding current" value. If trace 61b falls too far below the "holding current" value (see FIG. 5b) a rod-drop event has occurred and display 60" will automatically change to display a rod-drop measurement screen 60'.

The triggering event is depicted in display 60' of FIG. 5b and the resulting rod-drop measurement screen in 60" is depicted in FIG. 5c. As shown in FIG. 5c the rod-drop measurement screen 60" only displays the upper gripper coil-current trace 61b and the position (reed switch position) trace 62 as a function of time, the traces 61b and 62 being indexed on the initiation of the rod-drop event. Also as shown in FIG. 5c an "acceptance" trace 67 will be super-imposed on the rod-drop measurement screen that will aid the user in determining whether the upper gripper coil performance is within proper specifications during the rod-drop event. Naturally, the rod-drop event data can be saved (see box 66' of display 60") and the user can return to the normal monitoring display 60 of FIG. 5a.

As noted above, while an operational test is being monitored in real time, the user has the option of recording one CEDMs data, all eight CEDMs data and/or the rod-drop event data. Further, the user has the option of printing display data by selecting the mouse-activated print button 69f. Moreover, operational test data can be replayed any number of times by selecting the mouse-activated restart button 69h. Finally, a user may choose to quit the program at any time by selecting the mouse-activated quit button 69j.

Figure 6:
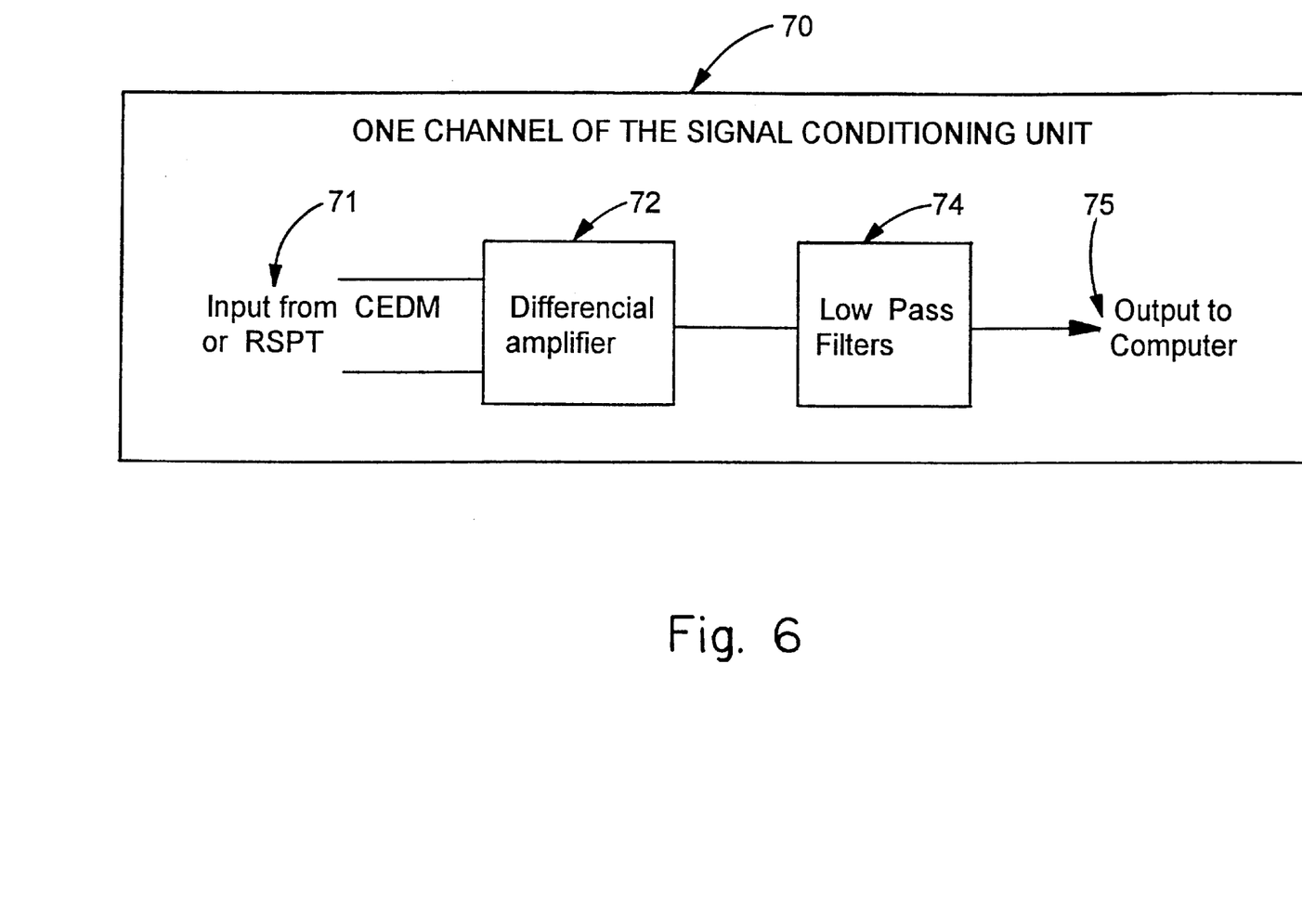
FIG. 6 is a block diagram of a portion of the signal conditioning aspect of the inventive CEDM data acquisition system.

Turning now to the signal conditioning aspect of the system, the block diagram of one signal conditioning unit 70 of the inventive system is shown in FIG. 6. Signaling conditioning unit 70 receives unprocessed analog coil-current and/or reed switch position signals at the input 71 thereof. The signals then pass to the differential amplifier 72 and low pass filter 74 where elimination of extraneous noise introduced into the signals by the electronic circuit powering the CEDMs is removed. Preferably, the differential amplifier 72 is a single integrated circuit which is preferably an isolation amplifier with supporting circuitry designed to provide high common mode rejection at the lowest of the frequencies of the extraneous noise (about 300 Hz and above) to be removed. Low pass filter 74 preferably has a cut-off frequency of about 300 Hz so as to further reduce extraneous noise from signals passing therethrough. Use of the isolation amplifier as shown offers the highly desirable feature that voltage spikes, or other erroneous electrical signals, which may occur downstream in the system, are not fed back to the control element drive mechanisms. After being, thus, conditioned the analog signals pass through an output 75 to an appropriate computer such as computers 46 or 46' depicted in FIGS. 2a and 2b, respectively.

Figure 7:
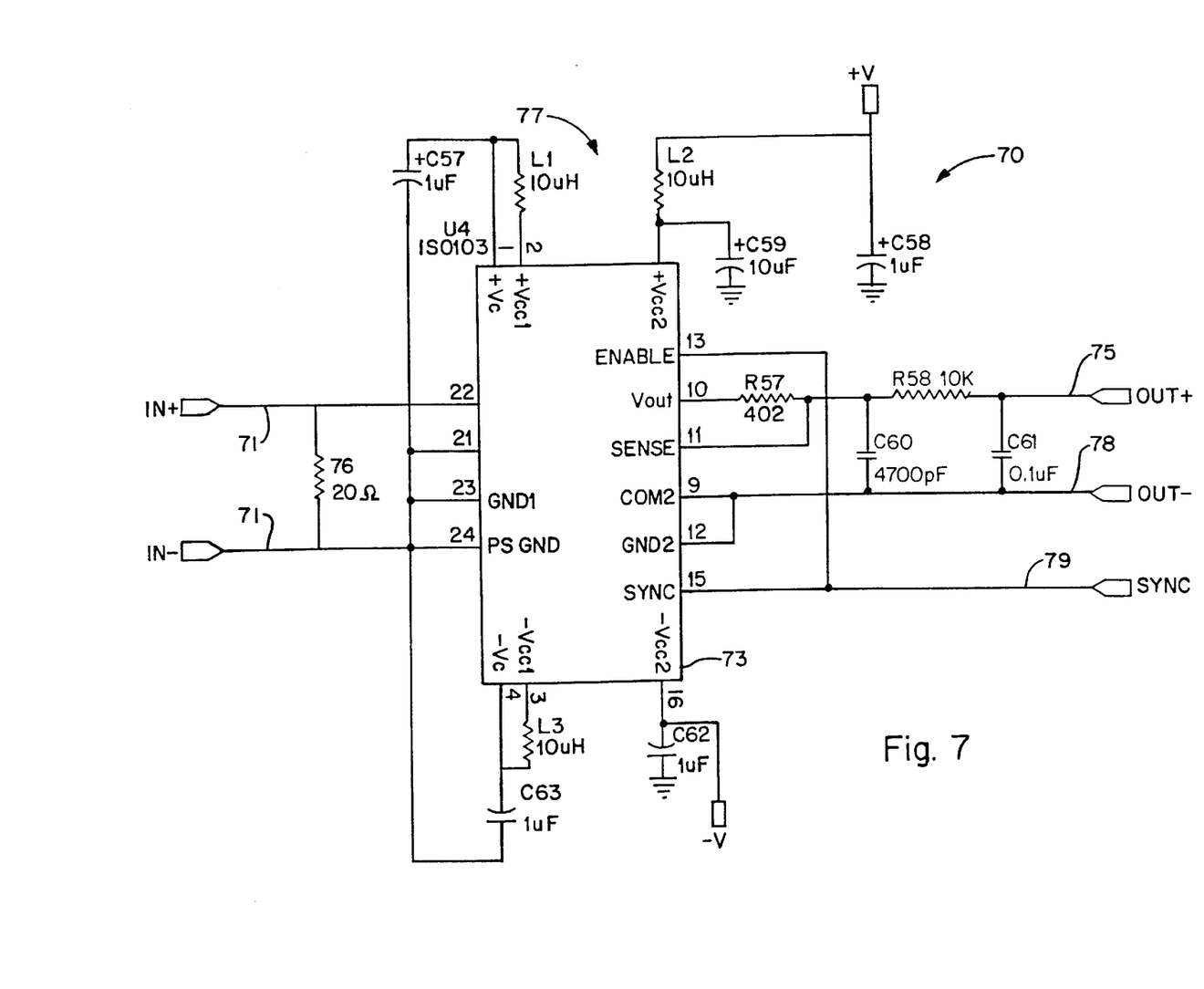
FIG. 7 is a schematic representation of one preferred signal conditioning unit of the inventive CEDM data acquisition system.

A schematic representation of the preferred signal conditioning unit 70 is shown in greater detail in FIG. 7. As shown, integrated circuit 73 is preferably an isolation amplifier having supporting circuitry 77 selected to provide high common mode rejection at or about the frequency of the alternating current supplied to the CEDMs. Additionally, signal conditioning unit 70 provides a low pass filter which has a cut off frequency of about 300 Hz. This is lower than the frequencies of noise contained in the DC current supplied to the CEDMs, but higher than an AC ripple component of the DC power. The preferred integrated circuit 73 can be purchased from Burr-Brown as Model No. ISO 165 and is preferred for its low power and high electrical isolation characteristics. Additionally, the Burr-Brown ISO 165 provides for signal gain. The Burr-Brown ISO 103 (which is depicted in FIG. 7) is also an acceptable alternative isolation amplifier. However, it is less desirable than the ISO 165 because it is more expensive, consumes more power, generates more heat and does not offer signal gain.

Also as shown in FIG. 6, the preferred supporting circuitry 77 includes a 20 ohm resistor 76 connected across the input terminals of integrated circuit 73. Resistor 76 provides the very advantageous feature of allowing the data acquisition system to be calibrated (to remove an offset component of the signals exiting the signal conditioning unit 44) without the physical manipulation of any components of the system. Instead, the system can be calibrated, without signal conditioning unit 44 (FIG. 1) being connected to the CEDM control cabinet 42, simply be selecting the appropriate option in the program main menu of the accompanying software. Resistor 76 does not otherwise effect conditioning of the signals entering input 71.

Figure 8:
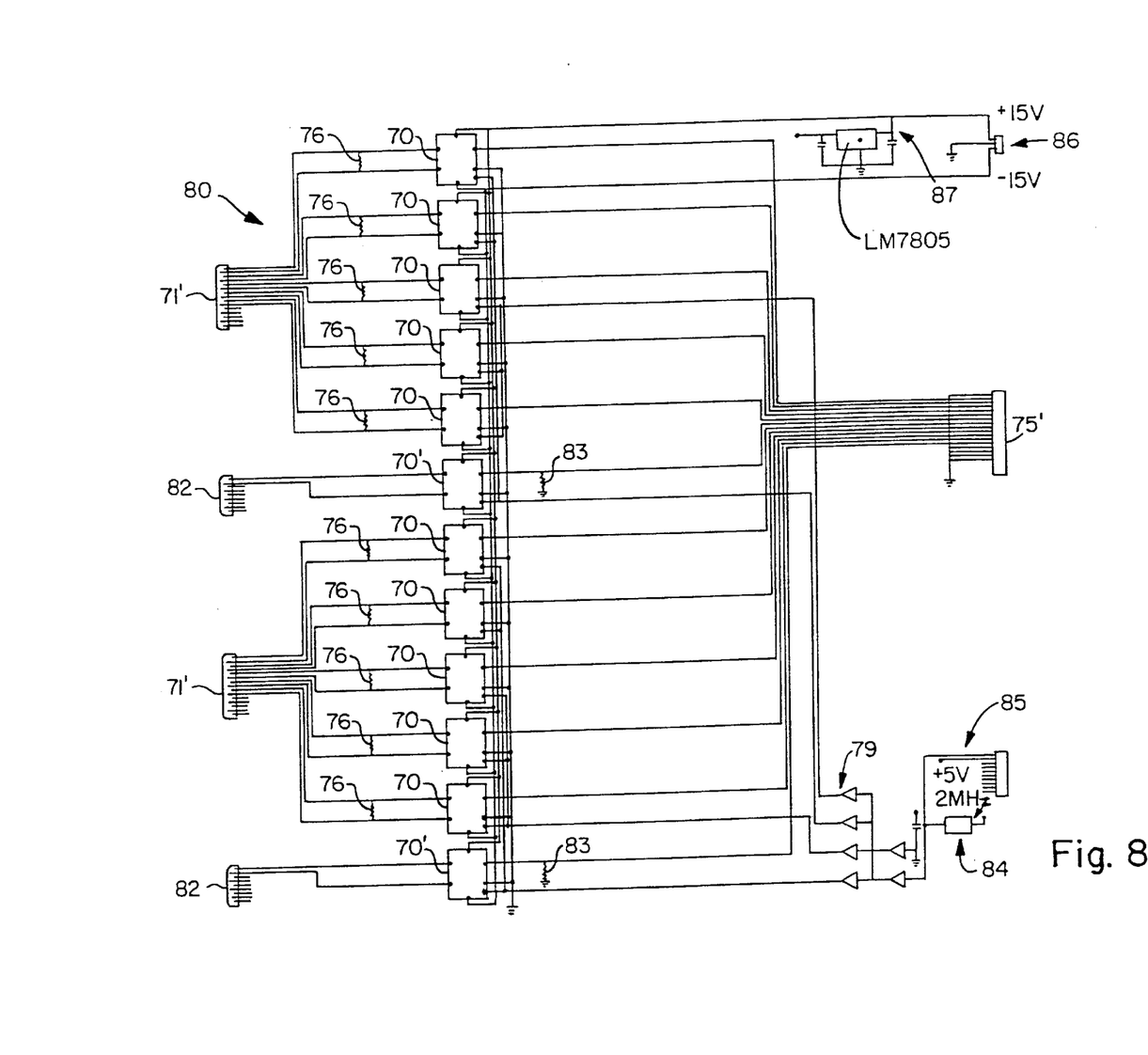
FIG. 8 is a schematic representation of a plurality of preferred signal conditioning units of the inventive CEDM data acquisition system.

A more extensive schematic of a complete circuit board containing, inter alia, a plurality of signal conditioning units 70 is shown in FIG. 8. As indicated by the use of comparable reference numerals, each signal conditioning unit 70 depicted in FIG. 8 should be understood to include the supporting circuitry depicted in FIG. 7. The circuit board 80 of FIG. 8 includes signal conditioning units for conditioning coil-current signals and reed position switch (i.e., position) signal for two CEDMs. Accordingly, the complete multi-rod data acquisition system 40 of FIG. 2a should be understood to include four nearly identical circuit boards 80.

As shown in FIG. 8, five signal conditioning units 70 are allocated for the five coils of each CEDM and these signal conditioning units receive input signals via input connector 71'. An additional signal conditioning unit 70' is allocated to condition the reed switch position signals which enter unit 70' via input connector 82. It will be appreciated that removal of an offset component of the position signal exiting the signal conditioning unit 44 is not necessary. Thus, no calibration resistor 76 is included in signal conditioning unit 70'. However, an amplitude reducing resistor 83 is connected to the output of signal conditioning unit 70' in order to ensure that the signals exiting unit 70' are compatible with the digital to analog converters of the computer into which signals will be entering. It will be appreciated that the lower lefthand portion of FIG. 8 is a repetition of the upper lefthand portion of FIG. 8 and is dedicated to signal conditioning the signals acquired from another CEDM.

Master circuit board 80 of FIG. 8 further includes means for receiving electric power 86 to operate signal conditioning units 70 and 70'. Also, an output connector 85' is utilized to connect a master oscillator 84 and a 5 volt regulator 87 of master circuit board 80 with the three other signal conditioning circuit boards. Similarly, an output signal connector 75' of each of the four circuit boards is in electrical communication with a downstream computer. The single master oscillator 84 generates identical synchronization signals 79 to operate all of the isolation amplifiers of system 40 in unison.

While the present invention has been described in connection with what is presently considered to be the most practical and preferred embodiments, it is to be understood that the invention is not limited to the disclosed embodiment, but is intended to cover the various modifications and equivalent arrangements included within the spirit and scope of the appended claims.

What is claimed is:

1. A data acquisition system for recording data associated with movement of at least one control element assembly through the nuclear reactor core of a nuclear steam supply system of the type having a plurality of control element drive mechanisms engaging a respective plurality of control element assembly shafts, each drive mechanism including a plurality of electrical coils which are powered by an electrical circuit to deliver coil-current whereby operation of the electrical circuit generates high frequency noise, said data acquisition system comprising:

measuring means for producing a respective analog coil-current signal commensurate with the coil current flow through at least some of the coils of a drive mechanism;

first signal conditioning means for receiving said analog coil-current signals and conditioning said signals to remove therefrom the high frequency noise generated by the electrical circuit;

first digitizing means for receiving and digitizing said conditioned analog coil-current signals to produce digital coil-current signals;

storage means for storing said digital coil-current signals on digital storage media; and means for displaying said digital coil-current signals received by said storage means, said means for displaying including means for automatically changing the display image when at least one of said digitized coil-current signals deviates from a predetermined value by a predetermined amount.

2. The data acquisition system of claim 1, wherein said measuring means comprises means for simultaneously measuring the coil-current flowing through each of five coils of each of at least four control element drive mechanisms to produce an analog coil-current signal for each of the coils, and wherein said first signal conditioning means removes noise introduced by the electrical circuit from all of said analog coil-current signals prior to said signals being received by said first digitizing means.

3. The data acquisition system of claim 1, wherein said system further comprises:

means for detecting the position in the reactor core of at least one of the control element assemblies to produce an analog position signal;

second signal conditioning means for receiving said analog position signals and conditioning said signals to remove therefrom noise introduced by the electrical circuit; and second digitizing means for receiving and digitizing said conditioned analog position signals to produce digital position signals;

said storage means further comprises means for storing said digital position signals; and said means for displaying further comprises means for automatically changing the display image to display only one of said digital coil-current signals and one of said digital position signals when said one of said digitized coil-current signals deviates from a predetermined value by a predetermined amount.

4. The data acquisition system of claim 1, wherein said system further comprises:

means for detecting the position in the reactor core of at least one of the control element assemblies to produce an analog position signal;

second signal conditioning means for receiving said analog position signals and conditioning said signals to remove therefrom noise introduced by the electrical circuit; and second digitizing means for receiving and digitizing said conditioned analog position signals to produce digital position signals;

said storage means further comprises means for storing said digital position signals; and said means for displaying further comprises means for automatically changing the display image to display a predetermined acceptance trace, only one of said digitized coil-current signals, and one of said digitized position signals, when said one of said digitized coil-current signals deviates from a predetermined value by a predetermined amount.

5. The data acquisition system of claim 1, wherein said first signal conditioning means comprises means for calibrating said system without physically modifying said first signal conditioning means.

6. The data acquisition system of claim 1, wherein
said system further comprises:
  means for detecting the position in the reactor core of at least one of the control element assemblies to produce an analog position signal;
  second signal conditioning means for receiving said analog position signals and conditioning said signals to remove therefrom noise introduced by the electrical circuit; and
  second digitizing means for receiving and digitizing said conditioned analog position signals to produce digital position signals;
said storage means further comprises means for storing said digital position signals;
said first signal conditioning means comprises:
  at least one isolation amplifier having high common-mode rejection at a frequency which is in the frequency range of the noise present in the current delivered to the coils by the electrical circuit;
  at least one low pass filter having a cut-off frequency below the frequency range of the noise present in the current delivered to the coils by the electrical circuit; and
  a master oscillator for synchronizing all of said isolation amplifiers with one another; and
said second signal conditioning means further comprises means for reducing the magnitude of said conditioned analog position signals for compatibility between said analog position signals and said second digitizing means.

7. A data acquisition system for recording data associated with movement of at least one control element assembly through the nuclear reactor core of a nuclear steam supply system of the type having a plurality of control element drive mechanisms engaging a respective plurality of control element assembly shafts, each drive mechanism including a plurality of electrical coils, said data acquisition system comprising:
  measuring means for producing a respective analog coil-current signal commensurate with the coil current flow through at least some of the coils of a drive mechanism;
  means for detecting the position in the reactor core of at least one of control element assemblies to produce an analog position signal;
  digitizing means for receiving and digitizing said analog coil-current signals to produce digital coil-current signals and for receiving and digitizing said analog position signals to produce digital position signals;
  storage means for storing said digital coil-current and position signals on digital storage media; and
  displaying means for simultaneously displaying each of five different digital coil-current signals for one control element drive mechanism and said digital position signal for the control element assembly controlled by the control element drive mechanism associated with said digital coil-current signals also being displayed, said displaying means further comprising means for automatically changing the display image to display a predetermined acceptance trace, only one of said digitized coil-current signals, and one of said digitized position signals, when said one of said digitized coil-current signals deviates from a predetermined value by a predetermined amount.

8. The data acquisition system of claim 7, wherein said measuring means comprises means for simultaneously measuring the coil-current flowing through each of five coils of each of at least four control element drive mechanisms to produce an analog coil-current signal for each of the coils, and wherein said first signal conditioning means removes noise introduced by the electrical circuit from all of said analog coil-current signals prior to said signals being received by said first digitizing means.

9. The data acquisition system of claim 7, wherein
said system further comprises:
  means for detecting the position in the reactor core of at least one of the control element assemblies to produce an analog position signal;
  second signal conditioning means for receiving said analog position signals and conditioning said signals to remove therefrom noise introduced by the electrical circuit; and
  second digitizing means for receiving and digitizing said conditioned analog position signals to produce digital position signals;
said storage means further comprises means for storing said digital position signals;
said first signal conditioning means comprises:
  at least one isolation amplifier having high common-mode rejection at a frequency which is in the frequency range of the noise present in the current delivered to the coils by the electrical circuit;
  at least one low pass filter having a cut-off frequency below the frequency range of the noise present in the current delivered to the coils by the electrical circuit; and
  a master oscillator for synchronizing all of said isolation amplifiers with one another; and
said second signal conditioning means further comprises means for reducing the magnitude of said conditioned analog position signals for compatibility between said analog position signals and said second digitizing means.

10. A data acquisition system for recording data associated with movement of at least one control element assembly through the nuclear reactor core of a nuclear steam supply system of the type having a plurality of control element drive mechanisms engaging a respective plurality of control element assembly shafts, each drive mechanism including a plurality of electrical coils, said data acquisition system comprising:
  measuring means for producing a respective analog coil-current signal commensurate with the coil current flow through at least some of the coils of a drive mechanism;
  first digitizing means for receiving and digitizing said analog coil-current signals to produce digital coil-current signals;
  storage means for storing said digital coil-current signals on digital storage media;

means for displaying said digital coil-current signals received by said storage means while said system stores said digital coil-current signals; and means for automatically changing the display image when at least one of said digitized coil-current signals deviates from a predetermined value by a predetermined amount.

11. The data acquisition system of claim 10, wherein said first measuring means comprises means for simultaneously measuring the coil-current flowing through each of five coils of each of at least four control element drive mechanisms to produce an analog coil-current signal for each of the coils, and wherein said first signal conditioning means removes noise introduced by the electrical circuit from all of said analog coil-current signals prior to said signals being received by said first digitizing means.

12. The data acquisition system of claim 10, wherein said system further comprises:

means for detecting the position in the reactor core of at least one of the control element assemblies to produce an analog position signal;

second signal conditioning means for receiving said analog position signals and conditioning said signals to remove therefrom noise introduced by the electrical circuit; and second digitizing means for receiving and digitizing said conditioned analog position signals to produce digital position signals;

said storage means further comprises means for storing said digital position signals; and said means for displaying further comprises means for automatically changing the display image to display only one of said digital coil-current signals and one of said digital position signals when said one of said digitized coil-current signals deviates from a predetermined value by a predetermined amount.

13. The data acquisition system of claim 10, wherein said system further comprises:

means for detecting the position in the reactor core of at least one of the control element assemblies to produce an analog position signal;

second signal conditioning means for receiving said analog position signals and conditioning said signals to remove therefrom noise introduced by the electrical circuit; and second digitizing means for receiving and digitizing said conditioned analog position signals to produce digital position signals;

said storage means further comprises means for storing said digital position signals; and said means for displaying further comprises means for automatically changing the display image to display a predetermined acceptance trace, only one of said digitized coil-current signals, and one of said digitized position signals, when said one of said digitized coil-current signals deviates from a predetermined value by a predetermined amount.

14. The data acquisition system of claim 10, wherein said first signal conditioning means comprises means for calibrating said system without physically modifying said first signal conditioning means.

15. The data acquisition system of claim 10, wherein said system further comprises:

means for detecting the position in the reactor core of at least one of the control element assemblies to produce an analog position signal;

second signal conditioning means for receiving said analog position signals and conditioning said signals to remove therefrom noise introduced by the electrical circuit; and second digitizing means for receiving and digitizing said conditioned analog position signals to produce digital position signals;

said storage means further comprises means for storing said digital position signals;

said first signal conditioning means comprises:

at least one isolation amplifier having high common-mode rejection at a frequency which is in the frequency range of the noise present in the current delivered to the coils by the electrical circuit;

at least one low pass filter having a cut-off frequency below the frequency range of the noise present in the current delivered to the coils by the electrical circuit; and a master oscillator for synchronizing all of said isolation amplifiers with one another; and said second signal conditioning means further comprises means for reducing the magnitude of said conditioned analog position signals for compatibility between said analog position signals and said second digitizing means.

* * * * *